A. WAGNER.
SLED RUNNER.
APPLICATION FILED APR. 1, 1909.
988,679.
Patented Apr. 4, 1911.
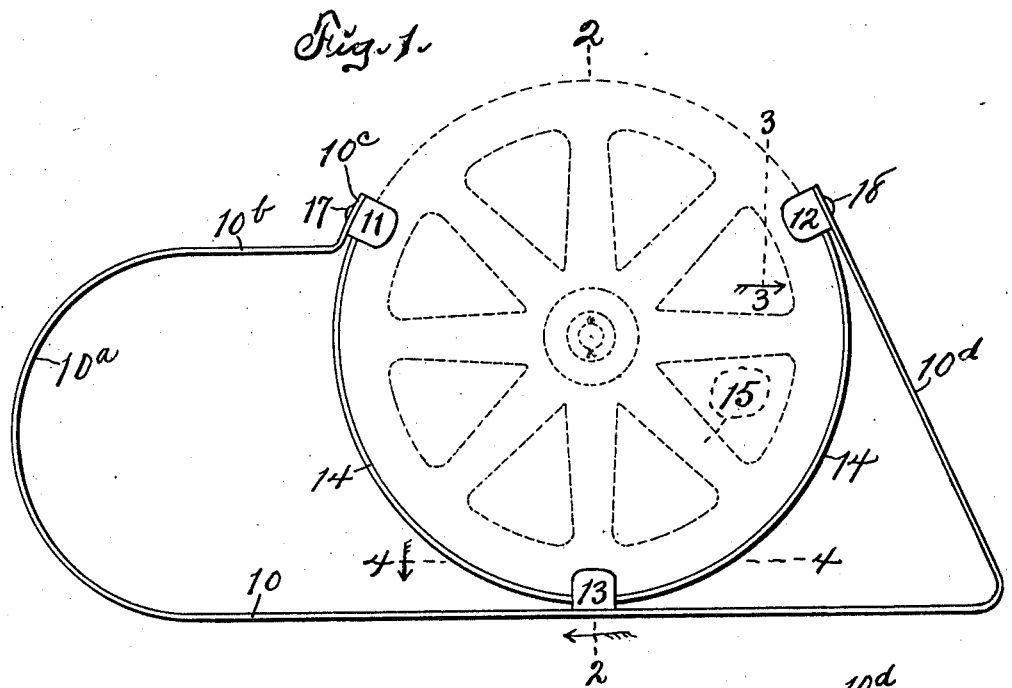
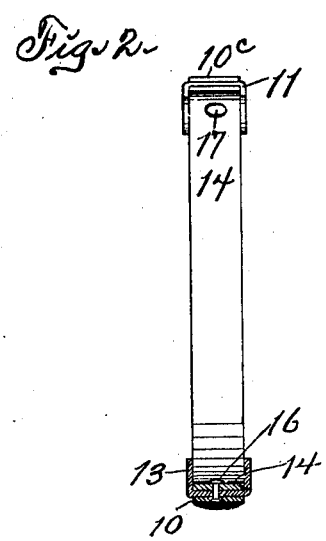
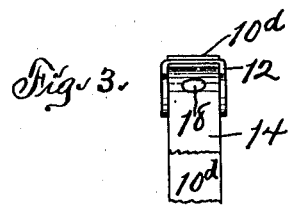
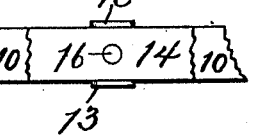
Attest:
Erl W. Miller
H. G. Sweet
Inventor:
Adam Wagner,
By J. E. Sweet Atty ic # UNITED STATES PATENT OFFICE.

ADAM WAGNER, OF CEDAR FALLS, IOWA.

SLED-RUNNER.

988,679.

Specification of Letters Patent.

Patented Apr. 4, 1911.

Application filed April 1, 1909. Serial No. 487,576.

*To all whom it may concern:*

Be it known that I, ADAM WAGNER, a citizen of the United States of America, and resident of Cedar Falls, Blackhawk county, Iowa, have invented a new and useful Sled-Runner, of which the following is a specification.

The object of this invention is to provide an improved construction for sled runners, adapted to be detachably mounted on and support vehicle wheels.

My invention consists in the construction, arrangement and combination of elements hereinafter set forth, pointed out in my claim and illustrated by the accompanying drawing, in which—

Figure 1 is a side elevation of the complete device, the dotted lines showing a vehicle wheel mounted therein in position for practical use. Fig. 2 is a cross-section on the indicated line 2—2 of Fig. 1. Fig. 3 is a vertical section on the indicated line 3—3 of Fig. 1. Fig. 4 is a horizontal section on the indicated line 4—4 of Fig. 1.

The device herein described is an improvement on the construction illustrated, described and claimed in the patent to Edward M. Henle, No. 921,109, granted May 11, 1909, to which reference is hereby made, and has been invented, designed and produced to adapt the general structure of the runner of the patent to convenient removable and replaceable connection with a wheel.

In the construction of the device as shown the numeral 10 designates a runner or shoe, preferably formed of a single piece of bar-metal. The shoe 10 preferably is plane in cross-section on its upper face and convex in cross-section on its lower face. The runner or shoe 10 is curved upward and rearward at its forward end, preferably on the arc of a circle, to form a relatively large arch or nose 10ᵃ. The upper extremity of the arch or nose 10ᵃ is extended rearward as an integral arm 10ᵇ and the extremity of said arm is bent upward at an obtuse angle to form a lip 10ᶜ and said lip is formed with a rivet hole. A yoke 11 is fixed to and projects rearward from the lip 10ᶜ. The rear end portion of the shoe or runner 10 is bent upward and forward to form an arm 10ᵈ rising to approximately the same height as the lip 10ᶜ and formed with a rivet hole in its extremity. A yoke 12 is fixed to and projects forward from the extremity of the arm 10ᵈ. A yoke 13 is fixed to and projects upward from the runner or shoe 10, preferably on the meridian line of the yokes 11, 12. A saddle 14 is provided and preferably is formed of a single piece of bar-metal, plane in cross-section on both faces. The saddle 14 is curved on the arc of a circle having a diameter equal to the diameter of the wheel 15 (dotted lines Fig. 1) to be mounted therein. The central portion of the saddle 14 rests in the yoke 13 and said saddle, yoke and the shoe 10 are rigidly connected by a rivet 16. The head of the rivet 16 preferably is counter-sunk in the lower face of the shoe 10. One end portion of the saddle 14 enters the yoke 11 and, together with said yoke and the lip 10ᶜ, is rigidly connected by a rivet 17. The opposite end portion of the saddle 14 enters the yoke 12 and, together with said yoke and the arm 10ᵈ, is rigidly connected by a rivet 18.

In practical use the yokes 11, 12 may be sprung apart sufficiently to permit the introduction of a wheel 15 laterally therein, and thereafter resilience of the saddle 14, arch 10ᵃ, arm 10ᵇ, arm 10ᵈ and shoe 10 will be exerted to cause the yokes 11, 12 to grip the rim of the wheel. It will be observed that the axis of the wheel 15 is below the horizontal plane of the yokes 11, 12, thus preventing accidental removal of the wheel from the runner by resistance of the runner to travel in either direction.

It is obvious that the runner above described may be applied to vehicle wheels of any desired character, but it has been designed particularly for use on toy wagons, coaster wagons and the like to transform said wagons into sleds for use on snow or ice. As many of the runners may be employed as there are wheels to the vehicle to be used, or part of the wheels may be supplied with runners and the remainder not so supplied.

I claim as my invention—

An improved vehicle runner, comprising a saddle bar made of spring metal, plane in cross-section, of segmental shape and comprising more than a half circle, said saddle bar being designed to receive a vehicle wheel, and a runner member made of spring metal plane in cross-section and comprising a flat body portion, a forward end portion curved upwardly and then rearwardly and then upwardly obliquely, and having the forward end of the saddle bar parallel with its oblique terminal, the rear end of the runner member being extended upwardly and forwardly obliquely and having the rear end of the saddle bar parallel with its terminal, a yoke on the central portion of the flat body of the runner member between the saddle and runner member and riveted to both of them, a yoke between the forward terminals of the runner member and saddle bar and riveted to both of them, and a yoke between the rear terminals of the runner member and saddle bar and riveted to both of them, the several yokes located at the points of an equilateral triangle and adapted to embrace the rim of a wheel.

Signed by me at Cedar Falls, Iowa, this 29" day of March, 1909.

ADAM WAGNER.

Witnesses:
W. H. MERNER,
HELEN E. DYER.

---

Copies of this patent may be obtained for five cents each, by addressing the "Commissioner of Patents, Washington, D. C."